United States Patent [19]

Herman

[11] Patent Number: 4,907,367

[45] Date of Patent: Mar. 13, 1990

[54] FLEXIBLE TINE INSECT SWATTER

[76] Inventor: Stephen Herman, 9341 Hazel Cir., Villa Park, Calif. 92667

[21] Appl. No.: 315,399

[22] Filed: Feb. 23, 1989

[51] Int. Cl.⁴ ............................................. A01M 3/02
[52] U.S. Cl. ...................................................... 43/137
[58] Field of Search ........................................... 43/137

[56]  References Cited
U.S. PATENT DOCUMENTS

| | | |
|---|---|---|
| 161,870 | 4/1875 | Dorrison . |
| 395,022 | 12/1888 | Wells . |
| 552,703 | 1/1896 | Burrowes . |
| 644,303 | 2/1900 | Rice . |
| 648,794 | 5/1900 | Rice . |
| 1,509,489 | 1/1922 | Rochwite ............... 43/137 |
| 1,886,039 | 11/1932 | Miller ..................... 43/137 |
| 1,966,954 | 7/1934 | Monroe et al. ......... 43/137 |
| 2,911,250 | 2/1957 | Lossius .................. 43/137 |
| 2,931,236 | 4/1960 | Schuler . |
| 2,963,816 | 12/1960 | De Miller . |
| 3,023,540 | 3/1962 | Schwab . |
| 3,905,146 | 9/1975 | Ralston . |
| 3,984,937 | 10/1976 | Hamilton . |
| 4,120,114 | 10/1978 | Little et al. . |
| 4,120,115 | 10/1978 | Mushkin . |
| 4,242,828 | 1/1981 | Schurger et al . |
| 4,617,754 | 10/1986 | Miley ..................... 43/137 |

Primary Examiner—Nicholas P. Godici
Assistant Examiner—Michael William Starkweather
Attorney, Agent, or Firm—Knobbe, Martens, Olson & Bear

[57] ABSTRACT

An insect swatter having flexible, parallel, non-overlapping, substantially contiguous tines allowing swatting of insects on regular or irregular surfaces, said tines being arranged to provide a substantially planar surface for striking insects by minimizing the force applied thereto so as to reduce lateral expulsion of insect bodily fluids.

11 Claims, 1 Drawing Sheet

U.S. Patent    Mar. 13, 1990    4,907,367
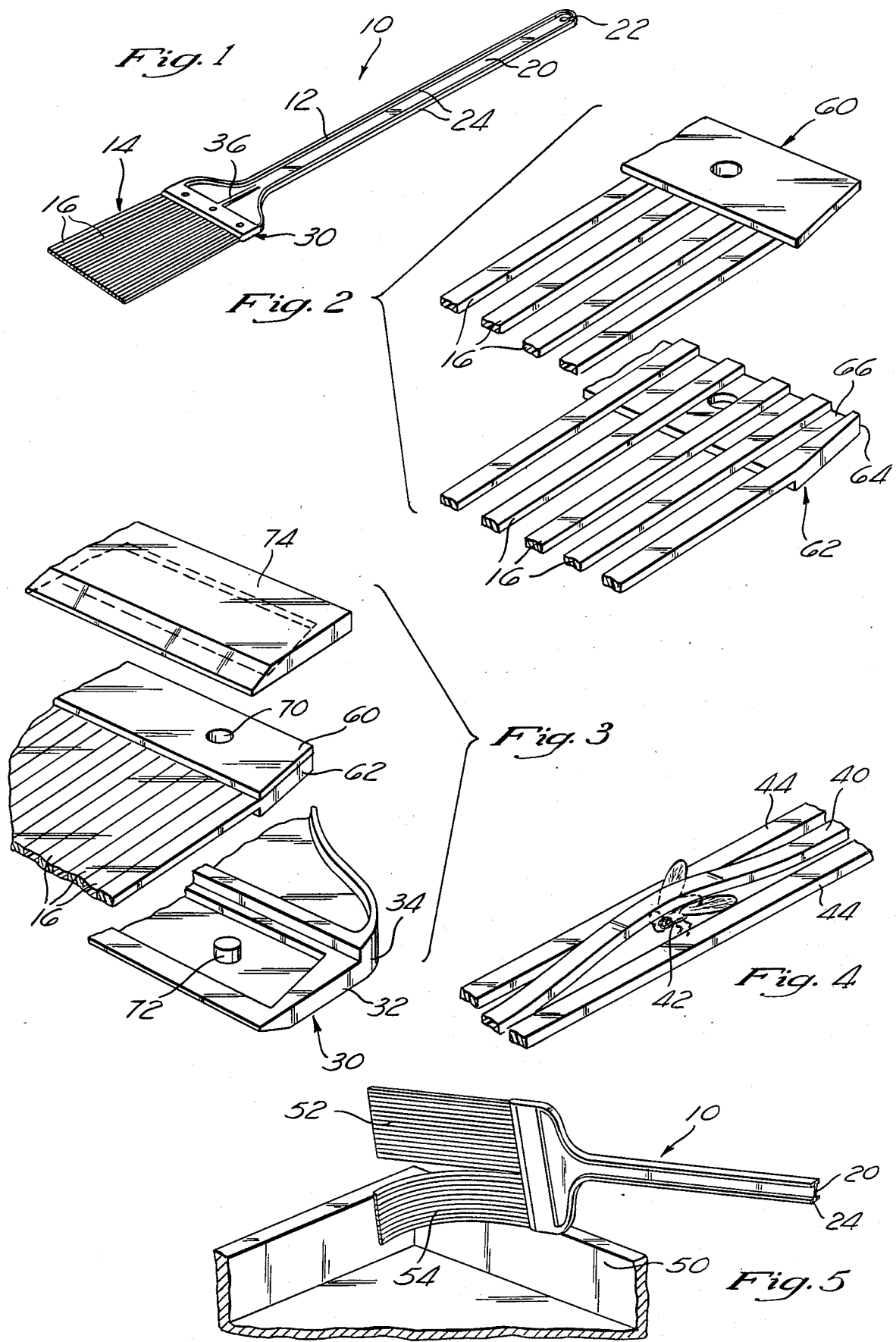

FLEXIBLE TINE INSECT SWATTER

FIELD OF THE INVENTION

This invention relates to insect swatters, and more particularly, to insect swatters for killing insects on regular and irregular surfaces and for minimizing lateral expulsion of insect bodily fluids.

BACKGROUND OF THE INVENTION

Insect swatters are well known in the art to comprise an elongate handle with either a planar striking head or a brush-like striking head made up of a host of individual tines. Examples of the former are U.S. Pat. Nos. 4,242,828 to Schurger, et al. and 2,963,816 to De Miller. It has been recognized in the art that insect swatters with these planar striking surfaces are difficult to utilize in killing insects on irregular surfaces. For example, the relatively large, planar surface is almost impossible to utilize in killing insects in the corner of a window sill. Another drawback associated with such insect swatters is that application of the swatter striking surface to an insect resting on a surface compresses the insect so as to cause lateral expulsion of the insect bodily fluids, commonly known as squishing. Squishing the insect causes unsightly and unsanitary staining of both the swatter striking surface and the surface on which the insect was resting prior to being swatted.

In addition to insect swatters with a planar swatting surface, the prior art discloses swatters with a plurality of elongated flexible tines having one end secured to one end of the handle. See, for example, U.S. Pat. Nos. 552,703 to Burrowes; 395,022 to Wells; 648,794 and 644,303 to Rice; 161,870 to Dorrison; and 3,905,146 to Ralston. It is recognized that this type of swatter allows killing of insects on irregular surfaces, such as corners. See U.S. Pat. No. 4,120,115 to Mushkin, Col. 1, lines 8-18. This type of swatter, however, exacerbates the squishing problem. The planar striking surface type swatters tend to distribute the striking force over the entire surface of the insect. On the other hand, the individual tine of the brush-type swatter concentrates the force on an isolated area of the insect, increasing the likelihood of rupture of the insect body and expulsion of the insect bodily fluids. As a result, the insect tends to become adhered either to the surface upon which it was resting prior to being struck or to the tines of the brush-type swatter.

It is therefore recognized in the art that there exists a need for an insect swatter capable of killing insects on irregular, as well as regular surfaces and minimizing the lateral expulsion of insect bodily fluids.

SUMMARY OF THE INVENTION

The present invention relates to an improved insect swatter having an elongate handle and attached thereto a plurality of flexible, parallel, non-overlapping, substantially contiguous tines forming a substantially planar surface for striking insects. The tines move independent of one another except where they are fixed to the handle. Accordingly, the tines are able to penetrate the interstices of irregular surfaces to reach insects lurking therein. Moreover, the planar striking surface formed by the tines acts to apply the force generated by a single tine only evenly across the surface of the insect, thereby reducing the amount of force applied to the insect. This reduction in force correspondingly reduces the chance of crushing the insect and causing expulsion of its bodily fluids, while providing enough force to kill the insect.

The tines are preferably molded of a flexible polymeric material. The molding process is advantageously performed by molding two sets of spaced parallel tines connected at one end thereof. The two sets are interleaved and fastened to the handle at the end at which they are connected. This method of molding the tines eliminates any labor intensive additional steps, such as slitting the tines from a planar sheet and further allows construction of a substantially contiguous planar surface without interstices which may allow escape of insects.

BRIEF DESCRIPTION OF THE DRAWINGS

FIG. 1 is a perspective view of the improved insect swatter of the present invention.

FIG. 2 is an exploded perspective fragmentary view of the tine sets of the insect swatter of FIG. 1.

FIG. 3 is an exploded perspective fragmentary view of the interleaved tine sets, handle receiving tray and retaining member of the insect swatter of FIG. 1.

FIG. 4 is a perspective fragmentary view of application of the present invention to an insect on a regular surface.

FIG. 5 is a view of the insect swatter of the present invention being applied to an insect on an irregular surface.

DETAILED DESCRIPTION OF THE PREFERRED EMBODIMENT

Referring to FIG. 1, the improved insect swatter 10 of the present invention comprises a handle 12 and a substantially planar striking surface 14 comprising individual tines 16.

The handle 12 has an elongate stem 20 suitable for gripping. One end of the stem 20 may be conveniently provided with an aperture 22 to facilitate hanging the insect swatter 10 from a hook, nail or other suitable protrusion. The handle stem 20 may be conveniently formed in a planar configuration having a laterally upstanding border 24 surrounding the periphery thereof for providing rigidity.

The handle 12 also comprises a tray 30 attached to the stem 20. The planar portion of the stem 20 necks out to the width of the tray 30. The border 24 may conveniently be terminated into the side surface 32 of the tray 30, as shown in FIG. 3. The intersection between the stem 20 and the tray 30 forms a thickened section 34. In addition to the support provided by the handle stem border 24, the strength of the stem/tray joint may be augmented by a number of suitable means, including the stiffening rib 36 shown in FIG. 1. The handle 12 may be conveniently formed of many suitable materials, including wood, wire, metal and plastic. A particularly preferred embodiment of the present invention contemplates forming the handle of a polymeric material, preferably polypropylene. Use of such material allows for easy molding of the handle 12 and use of brightly colored materials to enhance the attractiveness of the insect swatter 10.

Referring to FIG. 2, striking surface 14 is composed of tines 16. The tines 16 are preferably fashioned to be substantially contiguous so that they form a continuous planar striking surface 14. This requires only that tines 16 have one planar surface, but it has been found convenient to form tines 16 in square or rectangular cross-section. Tines 16 are formed so as to provide flexibility to facilitate their application to irregular surfaces. It has been found convenient to form tines 16 of a vinyl polymer. Application of a substantially continuous planar striking surface prevents escape of insects through striking surface interstices. On the other hand, the substantially contiguous, but independent, tines 16 allow application of a controlled amount of striking force limited to that provided by the accelerated mass of only the tines actually striking the insect. As shown more clearly in FIG. 4, the force of the striking tine 40 is applied to the insect 42 without contribution of the force delivered by adjoining tines 44. The tines 40, 44 shown in FIG. 4 are shown in a spaced parallel relation. However, it is preferred that the tines be substantially contiguous as shown in FIG. 1 to prevent escape of insects.

Referring to FIG. 5, the insect swatter 10 is shown being applied to an insect (not shown) on an irregular surface 50, such as a window sill. While the top tines 52 proceed unobstructed at the end of the swing, the bottom tines 54 penetrate the interstices of the irregular surface 50 to strike the insect lurking therein. Moreover, the configuration of the tines, coupled with the individual tine flexibility, allows penetration of the tines 16 into a small crevice, limited only by the width of an individual tine 16. Therefore, the substantially continuous planar striking surface 14 comprised of substantially contiguous individual tines 16 allows killing of insects on regular and irregular surfaces and limits the striking force so as to kill the insect with limited lateral expulsion of insect bodily fluids.

As shown in FIG. 2, it has been found convenient to form striking surface 14 from a first and second set of tines 60, 62. Each tine set 60, 62 is comprised of flexible parallel spaced tines 16 which are interconnected at end 64 thereof. The interconnection 66 is preferably provided in an offset manner as shown in FIG. 2 so as to facilitate interleaving tines 16 together as shown in FIG. 3. Preferably, the spacing between individual tines 16 is equal to the width of an individual tine 16. In this manner, first and second tine sets 60, 62 may be conveniently identically fashioned. It will be appreciated by one of ordinary skill in the art that the spacing between the tines 16 may be altered, for example, to equal two tine widths, so as to allow any number of tine sets. Use of multiple tine sets is preferred because the tine sets 60, 62 may be individually molded so that the tines 16 may be interleaved to form a substantially continuous planar surface without the need for any additional manufacturing steps, such as slitting or cutting.

Referring to FIG. 3, the interleaved tine sets 60, 62 are adapted to be received by shelf-like handle tray 30. The tine sets 60, 62 may be conveniently provided with a registration aperture 70 to mate with the registration boss 72 on the handle tray 30. One of ordinary skill in the art will appreciate that a number of suitable alternative registration means may be utilized to securely lock the tines 16 to the handle tray 30. The tines 16 may be attached to the handle tray 30 at their first end 64 by a number of suitable means. As shown in FIG. 3, a retaining bar 74 may be applied to the tray 30 to sandwich therebetween the first and second tine sets 60, 62. The retaining bar 74, handle tray 30 and tine sets 60, 62 may be conveniently joined by a number of methods, including adhesives and various fasteners. However, it has been found preferable to form the retaining bar 74 of a material similar to the handle tray 30, such as polypropylene, and heat-seal the retaining bar 74, handle tray 30 and tine sets 60, 62. The details of heat-sealing such materials are well known in the art and warrant no further discussion here.

This invention has been described in detail in connection with the preferred embodiments, but these are examples only and this invention is not restricted thereto. It will be easily understood by those skilled in the art that other variations and modifications can be easily made within the scope of this invention.

What is claimed is:

1. An insect swatter, comprising:
   a handle;
   a first tine set formed from a first unitary piece of material, said first tine set oriented parallel to said handle and having a first tine and a second tine in spaced parallel relationship, and being joined together and fixed with respect to said handle at the end proximate said handle; and
   a second tine set formed from a second unitary piece of material, said second tine set oriented parallel to said handle and having a third tine and a fourth tine in spaced parallel relationship, and being joined together and fixed with respect to said handle at the end proximate said handle such that said tines are interleaved so that the first tine, third tine, second tine, and fourth tine, respectively, form a substantially contiguous, planar striking surface whereby, due to such a configuration, the first set of tines move independently of the second set of tines thus allowing the swatter to penetrate interstices of irregular surfaces so as to reach insects lurking therein.

2. The insect swatter of claim 6, wherein said tray provides a planar shelf-like surface perpendicular to said stem.

3. The insect swatter of claim 1, wherein said handle comprises:
   an elongate stem proximal of said stem tines for gripping; and
   a tray attached to said stem located between said stem and said tines for receiving and fastening said tines.

4. The insect swatter of claim 1, wherein said tines are square in cross section.

5. The insect swatter of claim 1, wherein said tines are rectangular in cross section.

6. The insect swatter of claim 1, wherein said tines are formed from a polymeric material.

7. The insect swatter of claim 6, wherein said are formed from a vinyl polymer.

8. An insect swatter for killing insects on regular or irregular surfaces and limiting the extent of expulsion of insect bodily fluids, comprising:
   a handle having an elongated stem terminating at a rear end for gripping and at a forward planar tray perpendicular to said stem and opposite said stem rear end;
   a first set of flexible, parallel, spaced tines, a first end of said first tines being interconnected and received by said tray, and said first tines extending parallel to said stem from said tray away from said stem rear end;
   a second set of flexible, parallel, spaced tines, a first end of said second tines being interconnected and received by said tray, and said second tines extending parallel to said stem away from said stem rear end, said second tines being at least partially interleaved with said first tines so that the second end of said first and second tines form a substantially continuous planar striking surface on the top and bottom thereof; and means for retaining the first ends of said first and second tines in fixed relation with said tray whereby, due to such a configuration, the first set of tines move independently of the second set of tines thus allowing the swatter to penetrate interstices of irregular surfaces so as to reach insects lurking therein.

9. The insect swatter of claim 8, wherein said retaining means comprise a retaining bar heat sealed to said tray and sandwiching the first end of said first and second tine sets.

10. The insect swatter of claim 8, wherein said retaining means comprises an adhesive.

11. The insect swatter of claim 8, wherein said retaining means comprises a fastener.

* * * * *